United States Patent [19]
Packard et al.

[11] Patent Number: 5,978,198
[45] Date of Patent: Nov. 2, 1999

[54] TRANSIENT VOLTAGE SURGE SUPPRESSOR WITH THREE-WAY FAULT INDICATION

[75] Inventors: Thomas N. Packard, Syracuse; David A. Finlay, Sr., Marietta, both of N.Y.

[73] Assignee: Pass & Seymour, Inc., Solvay, N.Y.

[21] Appl. No.: 09/042,839

[22] Filed: Mar. 17, 1998

[51] Int. Cl.⁶ .................................................... H02H 3/22
[52] U.S. Cl. .............................................................. 361/111
[58] Field of Search ............................ 361/54, 56, 58, 361/103, 91, 104, 111, 119; 340/638, 639

[56] References Cited

U.S. PATENT DOCUMENTS

| | | |
|---|---|---|
| 3,619,775 | 11/1971 | Naylor et al. . |
| 3,846,698 | 11/1974 | Lawton . |
| 3,875,464 | 4/1975 | Gary et al. . |
| 3,999,176 | 12/1976 | Kellogg et al. . |
| 4,023,071 | 5/1977 | Fussell . |
| 4,056,816 | 11/1977 | Guim . |
| 4,210,906 | 7/1980 | Smith et al. . |
| 4,217,619 | 8/1980 | Tibolla . |
| 4,271,446 | 6/1981 | Comstock . |
| 4,389,693 | 6/1983 | Yanabu et al. . |
| 4,439,807 | 3/1984 | Reitz . |
| 4,577,148 | 3/1986 | Sweetana . |
| 4,583,086 | 4/1986 | Andrews et al. . |
| 4,584,622 | 4/1986 | Crosby et al. . |
| 4,628,394 | 12/1986 | Crosby et al. . |
| 4,677,518 | 6/1987 | Hershfeld . |
| 4,688,135 | 8/1987 | Leopold . |
| 4,739,436 | 4/1988 | Stefani et al. . |
| 4,802,055 | 1/1989 | Beckerman . |
| 4,912,590 | 3/1990 | Misenik et al. . |
| 5,006,950 | 4/1991 | Allina . |
| 5,032,946 | 7/1991 | Misencik et al. . |
| 5,105,327 | 4/1992 | Wohlforth . |
| 5,136,460 | 8/1992 | Misencik et al. ........................ 361/117 |
| 5,140,491 | 8/1992 | Allina . |
| 5,146,385 | 9/1992 | Misencik . |
| 5,224,009 | 6/1993 | Misencik . |
| 5,311,393 | 5/1994 | Bird . |
| 5,327,319 | 7/1994 | Lee et al. . |
| 5,379,177 | 1/1995 | Bird . |
| 5,388,021 | 2/1995 | Stahl . |
| 5,390,065 | 2/1995 | Allina et al. . |
| 5,438,473 | 8/1995 | Allina . |
| 5,444,593 | 8/1995 | Allina . |

*Primary Examiner*—Ronald W. Leja
*Attorney, Agent, or Firm*—Harter, Secrest & Emery LLP; Stephen B. Salai

[57] ABSTRACT

A transient voltage surge suppressor for an electrical circuit having a hot electrical conductor, a neutral electrical conductor, and a ground electrical conductor includes a first surge suppressor connected between the hot and neutral electrical conductors, a second surge suppressor connected between the hot and ground conductors, and a third surge suppressor connected between the neutral and ground conductors; a first over current fuse connected between the hot electrical conductor and the first and second surge suppressors and a second electrical fuse connected in series between the third surge suppressor and the neutral conductor; and a visible indicator connected between the first fuse and the second fuse for illuminating only when both said first and second fuses are intact, and extinguishing when either of the first and second fuses is open.

16 Claims, 1 Drawing Sheet

TRANSIENT VOLTAGE SURGE SUPPRESSOR WITH THREE-WAY FAULT INDICATION

FIELD OF THE INVENTION

This invention relates generally to indicators for transient voltage surge suppressors, and more particularly to a transient voltage surge suppressor having an indicator that reliably indicates the presence of a suppressor fault in any one of three modes in which surge protection is provided.

BACKGROUND OF THE INVENTION

In order to provide complete suppression of voltage transients in electrical circuits, and particularly circuits that include hot, neutral, and ground conductors, it is desirable to provide surge suppressors, such as metal oxide varistors, bridging each of the three possible pairs of conductors in which these voltage transients can occur. More specifically, it is desirable to provide a surge protection device connected between the hot and neutral lines, between the hot and ground lines, and between the neutral and ground lines.

Some forms of transient voltage surge suppression devices, such as varistors, are subject to failure during operation, either as a result of high energy transient voltages being applied to the devices, the repetitive application of lower energy transient voltages, or even the long term application of steady state voltages above the suppression threshold. Any one of these may lead to immediate failure.

The failure mode associated with metal oxide varistors, produces a short circuit or low impedance failure. That is, the impedance of the device is reduced significantly below its normal operating impedance, as a result of failure. It is known to protect electrical circuits against such failure, by providing fuses in series with the varistors so that if the varistors fail, the fuses open and the varistor does not itself cause a short circuit or low impedance condition on the power circuit, which could create a risk of overloading the circuit, leading to overheating, the tripping of remote circuit breakers, or the like.

When a metal oxide varistor fails in a way that causes a series connected fuse to open, the protection provided by the varistor is lost. Moreover, the failure may be undetectable by observation of the device or devices connected to the circuit. Therefore it is possible for the transient voltage protection to be lost without any obvious signs thereof, and thereafter for voltage transients to be passed unsuppressed to the equipment connected to the previously protected circuit, possibly causing damage.

In an effort to provide some indication of the failure of certain suppression devices, particularly varistors, indicators have been provided. Such indicators may be visual, such as a light emitting diode or other visible device; or audible such as a buzzer, horn or the like. While such devices are effective in indicating the loss of surge suppression, the additional components required to provide such indicators are expensive, increase the overall cost of the transient voltage surge suppression device, and therefore to some extent reduce the number of applications in which the surge suppression devices may be used. Suppression devices with indicators have been provided that overcome this problem to some extent by providing inexpensive indicator devices, either a light and/or an audible device, that indicates the failure of one or two legs of the surge suppressor, but to date, no device is known that uses a single indicator for indicating a failure of any one of three surge suppressors connected between the previously described pairs of lines in a two-wire plus ground electrical circuit.

While audible failure indicators are particularly desirable in applications where the surge suppression device is mounted in a visually inaccessible area, an audible alarm can itself cause problems. In applications where a fault occurs and an audible alarm sounds, it may be some time before a repair can be effected. Since surge suppression devices are often combined with electrical receptacles which are permanently connected to electrical circuits, trained personnel are needed to effect a replacement in the event of a fault.

In residential settings, or even in commercial or industrial settings, a trained person is not always immediately available. In these cases, the incessant buzzing of an audible alarm may be distressing to residents forced to listen to it during the time it takes for the device to be replaced. To this end, it is known to provide an audible alarm that can be deactivated, for example, by turning a screw that engages the diaphragm of a buzzer, thereby quieting it, or breaking a circuit trace connecting the buzzer to its power source, each of which effectively quiets the buzzer, but may do so in an irreversible fashion. Since the control for deactivating the buzzer must be accessible on the outside of the device, it may happen that the control is either accidentally or even maliciously engaged before a fault occurs, thereby in some instances rendering the audible portion of the alarm ineffective in the event of a failure. It would be advantageous to provide a control for disengaging an audible alarm that can be switched from an engaged position to a disengaged position repeatedly, so that if the alarm is accidentally disengaged before a fault occurs, the device is not thereby rendered inoperative in the future. It is desirable to do this switching electrically rather than mechanically, so as to provide repeatable engagement and disengagement without damage as may occur with a mechanical approach. Moreover, it is desirable to provide a control for disengaging an audible alarm that can be operated with readily available tools, such as the pointed tip of a pencil or pen, or the like, rather than requiring a screw driver or other tool that may not be available when needed. Such a device has the additional advantage of preventing accidental disengagement of the audible alarm.

It is an object of this invention to provide a transient voltage surge suppressor (TVSS) that overcomes the problems mentioned before.

It is a more particular object of this invention to provide an electrical receptacle with integral transient voltage suppression that includes an indicator light that is responsive to the failure of any of three transient voltage surge suppression devices, particularly metal oxide varistors, to provide a visible indication of such failure, so that the device can be replaced.

It is another object of this invention to provide an electrical receptacle that includes integral transient voltage surge suppression, together with an audible alarm that includes an actuator for selectively engaging or disengaging the alarm.

It is an even more particular object of the invention to provide a TVSS with such an actuator that can be repeatedly turned on or off without destroying or otherwise impairing the functioning of the audible alarm.

It is an even more specific object of the invention to provide a TVSS with an actuator for the alarm that can be disengaged with a simple tool, such as a pointed pen or pencil.

BRIEF DESCRIPTION OF THE DRAWINGS

The novel objects of this invention are set forth with particularity in the appended claims. The invention itself, together with further objects and advantages thereof, may be more readily comprehended by referring to the following detailed description of a presently preferred embodiment of the invention, taken in conjunction with the accompanying drawings, in which:

DETAILED DESCRIPTION OF THE PREFERRED EMBODIMENT

Figure 1:
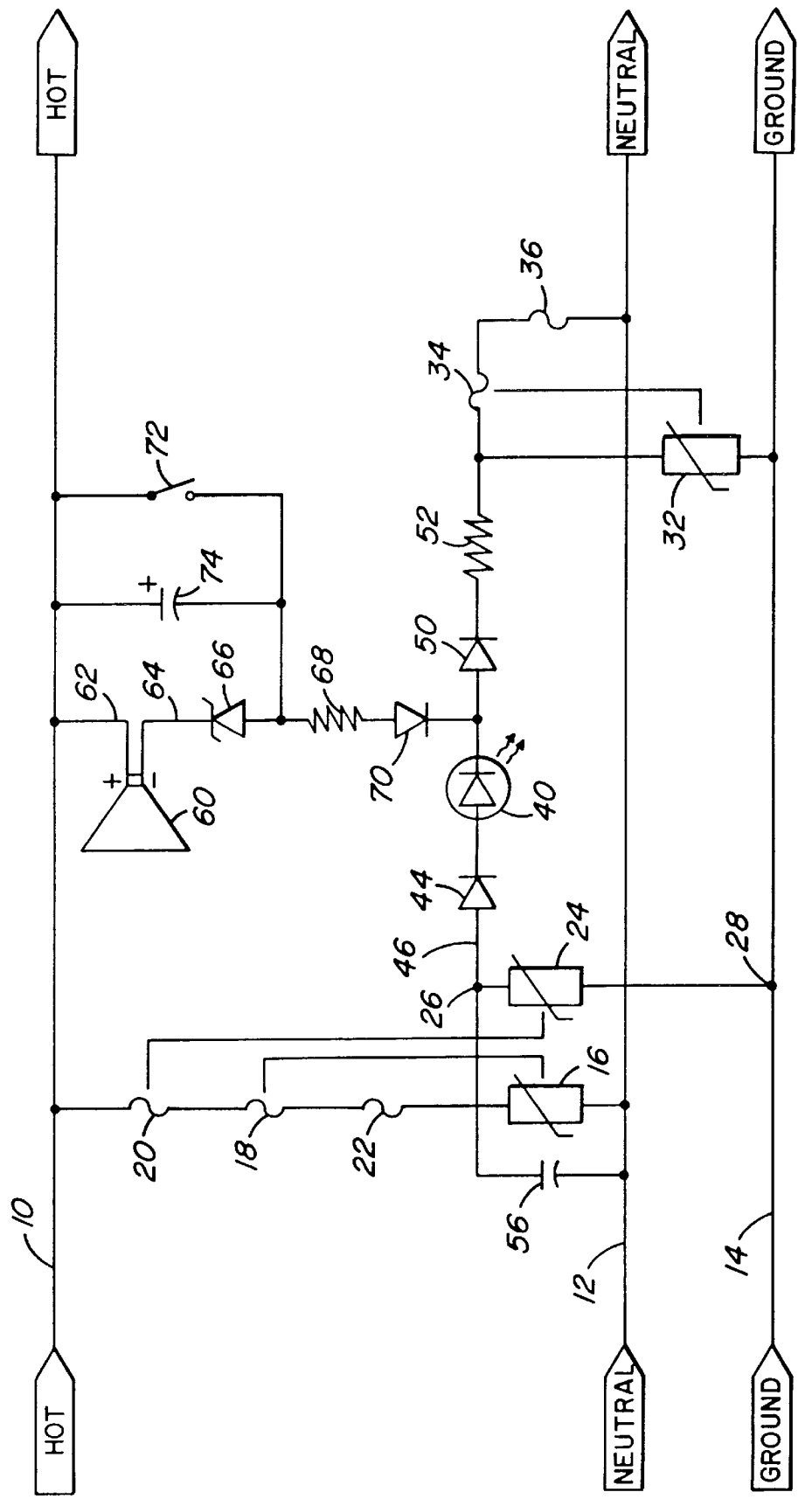
FIG. 1 is a schematic diagram of a transient voltage surge suppressor having an indicator for indicating the failure of any of three circuit suppression devices and an audible alarm for indicating the failure of the two most likely to fail ones of the surge suppression devices, together with a switch for deactivating the audible alarm in the event of failure, without permanently impairing the function of the alarm.

Referring now to FIG. 1, a transient voltage surge suppressor (TVSS) in accordance with this invention is illustrated in schematic form. The TVSS of this invention is particularly usefully employed in a low voltage 120 VAC single phase electrical circuit. The circuit includes three conductors that for convenience are referred to herein as the hot 10, neutral 12, and ground 14 conductors. Transient voltages are known to occur between any pair of two of these conductors, and surge suppression devices, such as metal oxide varistors, are arranged to absorb transient voltage surges between any pair of the conductors. Fuses are provided for disconnecting the surge suppression devices from the circuit in the event of failure. Two specific failure modes are provided for, over current failure and temperature failure.

A first metal oxide varistor 16, such as a 150 volt rms metal oxide varistor is connected in series with a first thermally responsive fuse 18, a second thermally responsive fuse 20, and a conventional over current fuse 22, and the series combination is connected between the hot conductor 10 and the neutral conductor 12. A second varistor 24 of the same type is connected at one end 26 in series with three fuses just mentioned, and the other end 28 is connected to the ground conductor. These two varistors protect the hot-neutral and hot-ground pairs. Each of the thermally responsive fuses 18, 20 is positioned physically close to one of the varistors 16, 24, so that a rise in temperature of the varistor, as would be caused by a failure, causes the adjacent fuse to open. Since the two thermally responsive fuses 18, 20 are connected in series, the thermal failure of either of the varistors will cause the connection of both varistors to the hot conductor to be broken. A third metal oxide varistor 32 is connected in series with another thermal fuse 34, and an over current fuse 36. The combination of the third varistor 32 and the two fuses 34, 36 is connected between the neutral conductor 12 and the ground conductor 14. A thermal failure or an impedance failure of the third varistor device 32 will cause one of the thermal fuse 34 or the over current fuse 36 to open, thereby disconnecting the varistor from the neutral-ground circuit.

A visible indicator, such as a light emitting diode 40, is connected between the hot conductor 10 and the neutral conductor, 12 so that the light emitting diode 40 is illuminated when all three of the varistors 16, 24, 32 are functional, more particularly when none of the fuses 18, 20, 22, 34, 36 is blown. A half wave rectifier diode 44 has its cathode 46 connected to the electrical conductor in series with the two thermal fuses 18, 20 and the over current fuse 22, feeding the first two varistors 16, 24. The anode of the rectifier diode 44 is connected to one terminal of the light emitting diode 40. The other terminal of the light emitting diode 40 is connected through a blocking diode 50 to a current limiting resistor 52, arranged in series, and then through the third thermal fuse 34 and third over current fuse 36 to the neutral electrical conductor 12. A decoupling capacitor 56 is preferably connected between the anode of the diode 44 and the neutral conductor 12.

When all of the fuses 18, 20, 22, 34 and 36 are intact, that is when no fault has occurred, a circuit is created from the hot-conductor 10 through the rectifier diode 44, the light emitting diode 40, the blocking diode 50, the current limiting resistor 52 and thence to the neutral conductor. If any of the three thermal fuses 18, 20, 34 or two over current fuses opens 22, 36, the circuit is interrupted and the light emitting diode is extinguished, thus providing a visible indication of a fault condition.

A TVSS in accordance with this invention also provides an audible indication of a fault in either of the varistors 16, 24 protecting the hot-neutral circuit or the hot-ground circuit respectively. A device, such as a simple buzzer 60 or a piezoelectric device, has one terminal 62 connected to the hot conductor 10, and the other terminal 64 connected by way of the series combination of a zener diode 66, a current limiting resistor 68, a first blocking diode 70, second blocking diode 50, second current limiting resistor 52, the thermal fuse 34, and the over current fuse 36 to the neutral conductor 12. The first and second thermal fuses 18, 20 and the first over current fuse 22 are connected in series with rectifier diode 44 and the light emitting diode 40 between the hot electrical conductor 10 and the junction of the two blocking diodes 70, 50 just mentioned, so that in normal operation no significant voltage passes through the buzzer, and the buzzer remains silent. If either of the varistors 16, 24 bridging the hot-neutral or hot-ground fails and any of the first and second thermal fuses 18, 20 and the first over current fuse 22 is opened, voltage across the buzzer 60 will cause it to sound.

In order to allow a user to deactivate the buzzer while awaiting repair, a normally open switch 72 is connected effectively across the combination of the buzzer 60 and the zener diode 66. When the switch 70 is closed, current through the buzzer 60 is shunted through the switch and the buzzer is silenced. A capacitor 74 is provided across the zener/audio alarm network to provide a DC voltage component to improve the audio alarm operating performance.

The buzzer deactivating switch 72 is a simple normally open electrical switch, rather than a device that permanently deactivates the alarm 60 or permanently interrupts a circuit trace. The switch 72, once closed, can be opened at will and the buzzer 60 reactivated. Heretofore, accidentally deactivating the buzzer might destroy the audible alarm feature of the device permanently, and require its replacement even before it is installed. The use of a normally open switch in accordance with this invention eliminates this problem, and allows the alarm to be deactivated and reactivated.

While the invention has been described in connection with a presently preferred embodiment thereof, those skilled in the art will recognize that modifications and changes may be made therein by those skilled in the art without departing from the true spirit and scope of the invention, which accordingly is intended to be defined solely by the appended claims.

What is claimed is:

1. A transient voltage surge suppressor for an electrical circuit having a hot electrical conductor, a neutral electrical conductor, and a ground electrical conductor comprising:

a first surge suppressor connected between the hot and neutral electrical conductors, a second surge suppressor connected between the hot and ground conductors, and a third surge suppressor connected between the neutral and ground conductors;

a first over current fuse connected between the hot electrical conductor and the first and second surge suppressors and a second overcurrent fuse connected in series between the third surge suppressor and the neutral conductor; and a visible indicator connected between the first fuse and the second fuse for illuminating only when both said first and second fuses are intact, and extinguishing when either of the first and second fuses is open.

2. The transient voltage surge suppressor of claim 1 also comprising a first thermal fuse connected in series with said first fuse and thermally coupled to the first surge suppressor for opening if the temperature of the first surge suppressor exceeds a predetermined value.

3. The transient voltage surge suppressor of claim 2 also comprising a second thermal fuse connected in series with said first over current fuse and thermally coupled to the second surge suppressor for opening if the temperature of the second surge suppressor exceeds a predetermined value.

4. The transient voltage surge suppressor of claim 3 comprising an audible alarm connected to the second thermal fuse for providing an audible signal when the second thermal fuse or the first overcurrent fuse opens.

5. The transient voltage surge suppressor of claim 4 comprising a switch connected to the audible alarm for repeatably disconnecting and connecting the alarm.

6. The transient voltage surge suppressor or claim 5, in which the switch comprises a normally open switch.

7. The transient voltage surge suppressor of claim 3 comprising an audible alarm connected across the first thermal fuse for providing an audible signal when the first thermal fuse opens.

8. The transient voltage surge suppressor of claim 2 comprising an audible alarm connected to one of the first thermal fuse and first overcurrent fuse for providing an audible signal when the thermal fuse or the overcurrent fuse opens.

9. The transient voltage surge suppressor of claim 8 comprising a switch connected to the audible alarm for repeatably disconnecting and connecting the alarm.

10. The transient voltage surge suppressor of claim 9, in which the switch comprises a normally open switch.

11. The transient voltage surge suppressor of claim 2 comprising an audible alarm connected across the first thermal fuse for providing an audible signal when the thermal fuse opens.

12. The transient voltage surge suppressor of claim 1 also comprising a third thermal fuse connected in series with said second over current fuse and thermally coupled to the third surge suppressor for opening if the temperature of the third surge suppressor exceeds a predetermined value.

13. The transient voltage surge suppressor for an electrical circuit of claim 1 comprising an audible alarm connected to the first over current fuse for providing an audible signal when the first over current fuse opens.

14. The transient voltage surge suppressor of claim 13 comprising a switch connected to the audible alarm for repeatably disconnecting and connecting the alarm.

15. The transient voltage surge suppressor of claim 14, in which the switch comprises a normally open switch.

16. The transient voltage surge suppressor for an electrical circuit of claim 1 comprising an audible alarm connected across the first over current fuse for providing an audible signal when the first over current fuse opens.

* * * * *